(12) United States Patent
Defiebre et al.

(10) Patent No.: US 10,606,712 B2
(45) Date of Patent: *Mar. 31, 2020

(54) METADATA RECOVERY FOR DE-DUPLICATED DATA

(71) Applicant: International Business Machines Corporation, Armonk, NY (US)

(72) Inventors: Mathias Defiebre, Mainz-Kastel (DE); Heiko Schloesser, Tucson, AZ (US); Christof Schmitt, Tucson, AZ (US); Erik Rueger, Ockenheim (DE); Frank Krick, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/142,732

(22) Filed: Sep. 26, 2018

(65) Prior Publication Data
US 2019/0026197 A1    Jan. 24, 2019

Related U.S. Application Data

(63) Continuation of application No. 15/479,328, filed on Apr. 5, 2017, now Pat. No. 10,169,168.

(51) Int. Cl.
*G06F 11/14*      (2006.01)
*G06F 16/22*      (2019.01)
*G06F 16/2455*    (2019.01)

(52) U.S. Cl.
CPC ...... *G06F 11/1471* (2013.01); *G06F 11/1489* (2013.01); *G06F 16/22* (2019.01); *G06F 16/24554* (2019.01); *G06F 16/24562* (2019.01); *G06F 16/24568* (2019.01)

(58) Field of Classification Search
CPC ............. G06F 11/1471; G06F 11/1489; G06F 11/30312
See application file for complete search history.

(56) References Cited

U.S. PATENT DOCUMENTS

| 7,913,114 B2 | 3/2011 | Leppard |
| 8,290,915 B2 | 10/2012 | Anglin |
| 8,442,952 B1 | 5/2013 | Armangau et al. |
| 9,298,386 B2 | 3/2016 | Baldwin et al. |
| 9,367,397 B1 | 6/2016 | Xie et al. |

(Continued)

OTHER PUBLICATIONS

Defiebre et al., "Metadata Recovery for De-duplicated Data", U.S. Appl. No. 16/351,836, filed Mar. 13, 2019.

(Continued)

*Primary Examiner* — Loc Tran
(74) *Attorney, Agent, or Firm* — Nicholas D. Bowman

(57) ABSTRACT

A data stream is stored in storage media. As part of the storage, the data stream is divided into a plurality of chunks. The plurality of chunks include a target chunk that is next to a first chunk in a file within the data stream. A determination is made that the target chunk matches an existing chunk stored in the storage media. In response to the determination, a first pointer to the existing stored chunk is created in file metadata for the file. Also in response to the determination, a second pointer to a first stored chunk that matches the first chunk is created in chunk metadata embedded with the existing stored chunk.

19 Claims, 9 Drawing Sheets

(56) References Cited

U.S. PATENT DOCUMENTS

| | | | | |
|---|---|---|---|---|
| 2007/0083708 | A1* | 4/2007 | Zhou | G06F 3/0613 711/114 |
| 2015/0193160 | A1 | 7/2015 | Li et al. | |
| 2016/0078068 | A1* | 3/2016 | Agrawal | G06F 11/1464 707/692 |
| 2016/0371294 | A1* | 12/2016 | Aronovich | G06F 16/1748 |
| 2017/0083408 | A1 | 3/2017 | Vijayan | |

OTHER PUBLICATIONS

IBM, List of IBM Patents or Patent Applications Treated as Related, Mar. 12, 2019, 2 pages.

Accelerated Examination Support Document, U.S. Appl. No. 16/351,836, dated Mar. 12, 2019, 46 pgs.

Nam et al., "Reliability-Aware Deduplication Storage: Assuring Chunk Reliability and Chunk Loss Severity", 2011 International Green Computing Conference and Workshops (IGCC), Jul. 25-28, 2011, 6 pages. DOI: 10.1109/IGCC.2011.6008566.

Rozier et al., "Modeling the Fault Tolerance Consequences of Deduplication", 2011 30th IEEE International Symposium on Reliable Distributed Systems, Oct. 4-7, 2011, pp. 75-84 DOI: 10.1109/SRDS.2011.18.

Unknown, "Data deduplication", From Wikipedia, the free encyclopedia, last modified on Jan. 10, 2017, printed on Feb. 13, 2017, 6 pages.

Defiebre et al., "Metadata Recovery for De-duplicated Data", U.S. Appl. No. 15/479,328, filed Apr. 5, 2017.

Defiebre et al., "Metadata Recovery for De-duplicated Data", U.S. Appl. No. 15/844,675, filed Dec. 18, 2017.

Accelerated Examination Support Document, U.S. Appl. No. 15/844,675, dated Dec. 11, 2017, 27 pgs.

IBM, List of IBM Patents or Patent Applications Treated as Related, Sep. 26, 2018, 2 pages.

\* cited by examiner

METADATA RECOVERY FOR DE-DUPLICATED DATA

BACKGROUND

The present disclosure relates generally to the field of data processing, and, more particularly, to metadata recovery for de-duplicated data.

As the amount of information being stored continues to increase every year, the importance of intelligently managing data storage has become more important. One technique for managing data storage is de-duplication. This technique is used in many computing environments to decrease the amount of space required to store a given quantity of data.

SUMMARY

Embodiments of the present disclosure include a method for storing a data stream in storage media. As part of the method, the data stream is divided into a plurality of chunks. The plurality of chunks include a target chunk that is next to a first chunk in a file within the data stream. A determination is made that the target chunk matches an existing chunk stored in the storage media. In response to the determination, a first pointer to the existing stored chunk is created in file metadata for the file. Also in response to the determination, a second pointer to a first stored chunk that matches the first chunk is created in chunk metadata embedded with the existing stored chunk.

Embodiments of the present disclosure further include a computer program product for managing a file stored on storage media. The file includes file data that is stored as a plurality of chunks on a first storage entity of the storage media. Each stored chunk includes chunk metadata embedded therewith. The file further includes file metadata that is stored on a second storage entity of the storage media. The computer program product is a computer readable storage medium that has program instructions embodied thereon. The program instructions are configured to cause a computer to perform a method. As part of the method, loss or corruption of the stored file metadata is detected. In response to the detection, a recovery operation is performed. As part of the recovery operation, chunk metadata embedded with a first stored chunk of the plurality of chunks is read. Based on reading the chunk metadata embedded with the first stored chunk, a determination is made that the first chunk does not have any preceding chunks in the file. Also based on reading the chunk metadata embedded with the first stored chunk, a pointer to a second stored chunk is identified. Based on the pointer, a determination is made that the second chunk follows the first chunk in the file. A recovered version of the file metadata is written in the second storage entity. Based on the determination that the first chunk does not have any preceding chunks in the file and further based on the determination that the second chunk follows the first chunk in the file, the recovered version of the file metadata indicates that the first chunk is the initial chunk of the file and the second chunk follows the initial chunk in the file.

Embodiments of the present disclosure further include a system. The system includes a processor and a memory. The processor is in communication with the memory and is configured to obtain instructions from the memory that cause the processor to perform a method. As part of the method, a data stream including a file to be stored in storage media is received. The storage media includes a data storage entity and metadata storage entity. The received file is divided into a plurality of chunks. Each chunk of the plurality of chunks is compared with existing chunks stored in the data storage entity. For each chunk of the plurality of chunks that does not match any of the existing chunks, the chunk is stored in the data storage entity. If the stored chunk is not the first chunk in the file or the last chunk in the file, a metadata field that includes a pointer to a chunk following the stored chunk in the file is embedded with the stored chunk. If the stored chunk is the first chunk in the file, a metadata field that includes a pointer to a chunk following the stored chunk in the file and an indicator that the stored chunk is the first chunk in the file is embedded with the stored chunk. If the stored chunk is the last chunk in the file, a metadata field that includes an indicator that the stored chunk is the last chunk in the file is embedded with the stored chunk. File metadata stored in the metadata storage entity is updated to include a pointer to the stored chunk. For each chunk of the plurality of chunks that does match an existing chunk, the chunk is not-stored in the data storage entity. If the not-stored chunk is not the first chunk in the file or the last chunk in the file, a metadata field embedded in the existing chunk is updated to include a pointer to a chunk following the not-stored chunk in the file. If the not-stored chunk is the first chunk in the file, the metadata field embedded in the existing chunk is updated to include a pointer to a chunk following the not-stored chunk in the file and an indicator that the not-stored chunk is the first chunk in the file. If the not-stored chunk is the last chunk in the file, the metadata field embedded in the existing chunk is updated to include an indicator that the not-stored chunk is the last chunk in the file. File metadata stored in the metadata storage entity is updated to include a pointer to the existing chunk.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
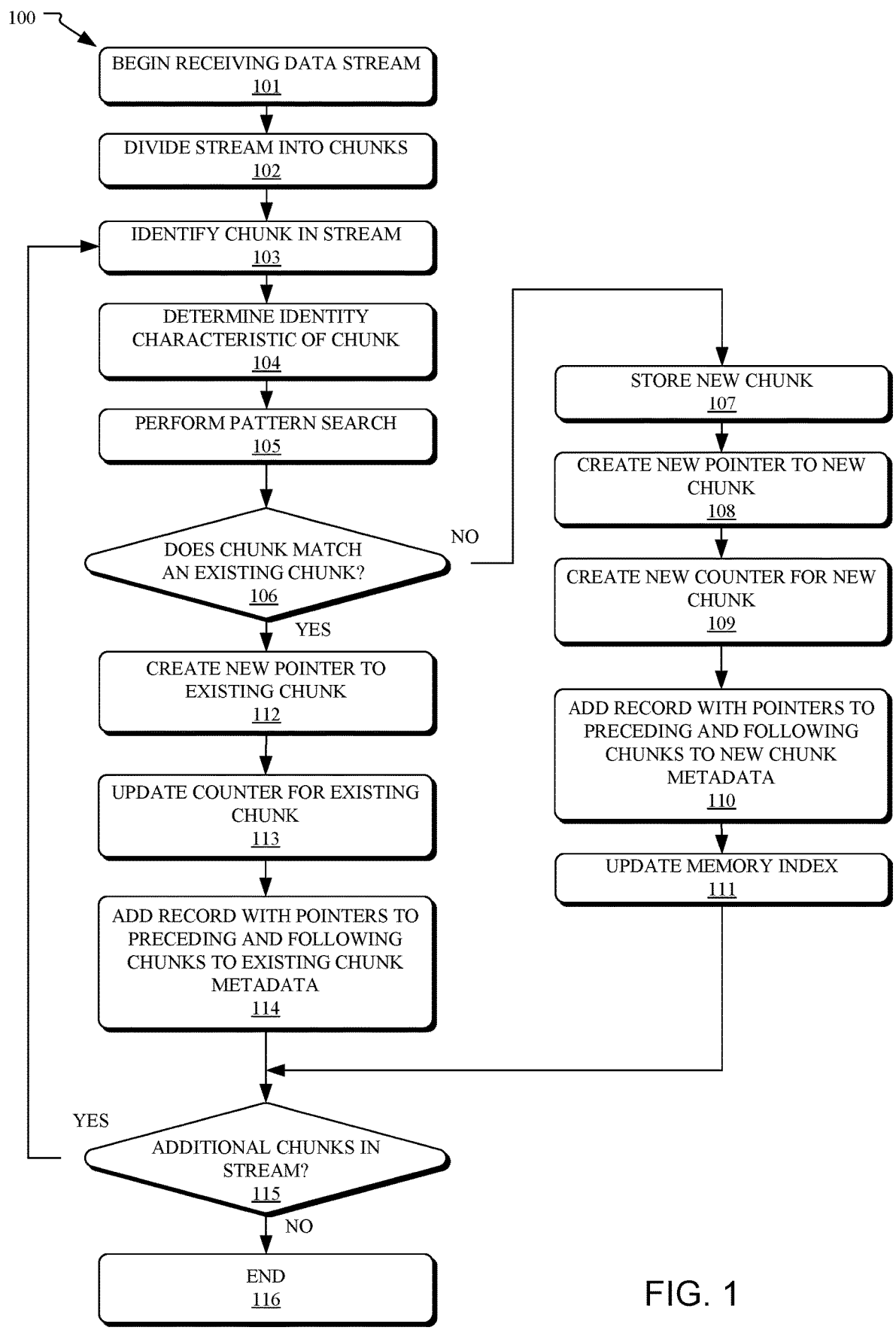
FIG. 1 illustrates a flow diagram of a method for storing de-duplicated data on storage media, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of data processing, and, more particularly, to metadata recovery for de-duplicated data. While the present disclosure is not necessarily limited to such applications, various aspects of the disclosure may be appreciated through a discussion of various examples using this context.

In some embodiments, the storage of de-duplicated files involves storing file data separately from file metadata for the purpose of saving storage space. If the file metadata is lost or corrupted, however, the result may be that the file data itself becomes unusable, and the entire set of files can only be recovered by re-copying them from a backup source. This is often a serious burden on computing resources. In some embodiments, this unfortunate situation can be avoided by embedding certain metadata with the file data itself. Then, in the event that the main file metadata is lost, it can be recovered using the metadata that is embedded with the file data. This can result in large savings of computing resources when file metadata recovery becomes necessary.

Referring now to the figures, shown in FIG. 1 is a flow diagram of a method 100 for storing de-duplicated data on storage media, in accordance with embodiments of the present disclosure. In some embodiments, operations of the method 100 may be performed by a processor of a computer storage system. The method 100 may begin at operation 101, wherein the system begins receiving a data stream. The stream may be received, for example, from a remote computer attempting to store, on the storage media, a set of files included in the stream. Per operation 102, the data stream is divided (e.g., split) into a plurality of chunks (e.g., data fragments) in a process referred to as chunking. These chunks may be of fixed or variable size depending on the storage parameters of the system.

Per operation 103, an individual chunk is identified in the data stream. Per operation 104, the identity characteristics of the selected chunk are determined. The identity characteristics may include aspects of the selected chunk that distinguish it from other chunks. In some embodiments, determining the identity characteristics of a chunk involves creating a hash of all or a portion of the chunk. Per operation 104, a pattern search is performed. This pattern search may involve comparing the identity characteristics of the selected chunk to identity characteristics of other existing chunks already stored in the storage media. For example, this may involve comparing the hash of the selected chunk to hashes of the existing chunks. These hashes of existing chunks may be stored in a memory index that is updated with a new hash each time a corresponding new chunk is stored in the storage media.

Per operation 106, a determination is made, based on the identity characteristic comparisons, as to whether the selected chunk matches any existing (e.g., previously stored) chunk. If the selected chunk does not match any existing chunk, then the method proceeds to operation 107, wherein the selected chunk is stored as a new chunk in the storage media. Per operation 108, a new pointer (e.g., reference, location identifier) is created for the new chunk. This pointer may be stored in a metadata structure that hosts the file metadata for the file of which the selected chunk is a part. Per operation 109, a new counter for the new chunk is created (e.g., written). In some embodiments, a counter may serve to indicate the number of times that a particular chunk is included in files stored in the storage media. As new files incorporating that chunk are added to the storage media the counter is increased and when old files incorporating that chunk are removed (e.g., deleted) from the storage media the counter is decreased. In some embodiments, the counter may aid garbage collection activities in the storage media (e.g., when the counter hits "0", the corresponding chunk can be erased from storage).

Per operation 110, a record is added to new chunk metadata (e.g., a metadata field) that is embedded with (e.g., appended to) the new chunk in the storage media. This record includes a pointer to the chunk preceding (e.g., immediately in front of) the selected chunk in the file and a second pointer to the chunk following (e.g., immediately after) the selected chunk in the file. Additional metadata may also be included in the record, including, for example, an identifier of the file to which the selected chunk belongs. Per operation 111, the memory index is updated to include the identity characteristics of the new chunk so that other chunks may analyzed against that information as part of future pattern match searches.

Returning now to operation 106, if the selected chunk does match an existing chunk, then the method proceeds to operation 112 (rather than 107), wherein a new pointer to the existing chunk is created. This pointer may be stored in a metadata structure that hosts the file metadata for the file of which the selected chunk is a part. Per operation 113, a counter for the existing chunk is updated (e.g., increased by 1). Per operation 114, a record is added to existing chunk metadata that is embedded with the existing chunk in the storage media. This record includes a pointer to the chunk preceding the selected chunk in the file and a second pointer to the chunk following the selected chunk in the file.

Upon completion of operation 111 or 114, the method proceeds to operation 115, wherein a determination is made as to whether there are additional chunks in the data stream that need to be stored. If there are additional chunks, then the method loops back to operation 103, and operations 103 to 115 are repeated, as applicable. If there are no additional chunks in the data stream, then the method ends at operation 116.

Figure 2:
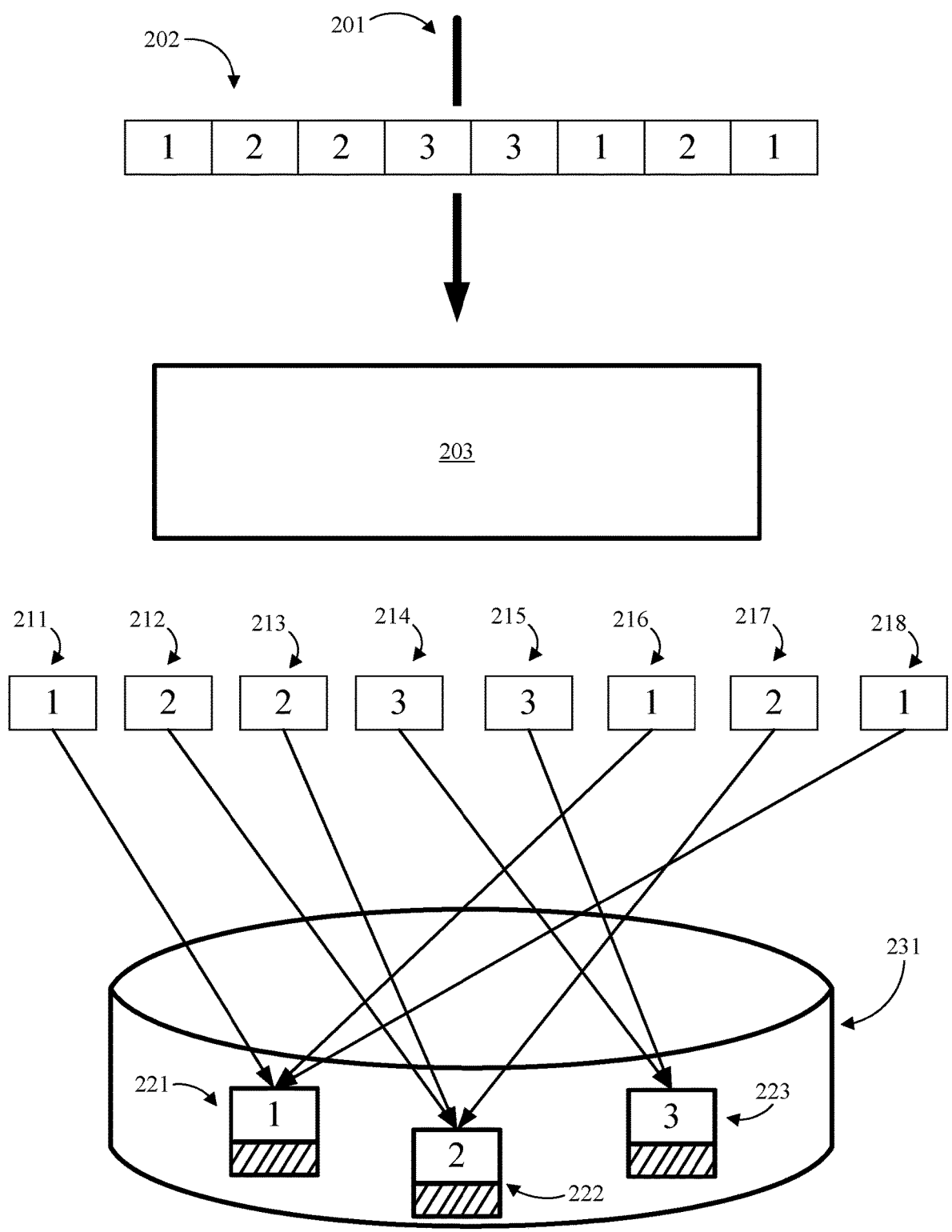
FIG. 2 illustrates a block diagram of an example file of a data stream being de-duplicated for storage in storage media, in accordance with embodiments of the present disclosure.

Referring now to FIG. 2, shown is a block diagram of an example file 202 of a data stream 201 being de-duplicated for storage in storage media 231, in accordance with embodiments of the present disclosure. The block diagram includes embodiments of the method 100 being performed on the file 202. As shown, the data stream 201 is received by a storage system. The data stream 201 includes a file 202 of user data. The series of combined data portions making up the file 202 is represented in the diagram by the series of segments with non-identical segments numbered differently.

This file 202 is sent to a chunker 203 that divides the file 202 into its constituent chunks 211-218. As shown, the chunks are then stored as chunks 221-223 in storage media 231. As stored, the chunks 221-223 each include embedded metadata (represented by the lined portions of each stored chunk).

As the chunks 211-218 are de-duplicated, the new chunks that match (e.g., are identical to) existing chunks are not stored, but rather a new pointer to the corresponding existing chunk is added to the file metadata (not shown) for the file 202 and additional pointers (to preceding and following chunks) are added to the chunk metadata embedded with the corresponding existing chunk. For new chunks that do not match existing chunks, the chunk is stored, a new pointer to the newly stored chunk is added to the file metadata, and the additional pointer are added to the newly stored chunk's embedded metadata. In some embodiments, the stored chunks 221-223 are compressed to further save space in the storage media 231.

In an example relevant to FIG. 2, the file 202 is received and chunk 211 is selected. A pattern search reveals that there are no existing chunks in the storage (e.g., no chunks stored as part of preceding files in the data stream 201 or chunks received in prior data streams). Chunk 211 is therefore stored as chunk 221 and the file metadata for file 202 and chunk metadata for new chunk 221 are created/updated. Later, when chunks 216 and 218 are processed, they are not stored as chunks in storage media 231, instead the file metadata for file 202 and the chunk metadata for the existing (previously stored) chunk 221 are created/updated.

Figure 3:
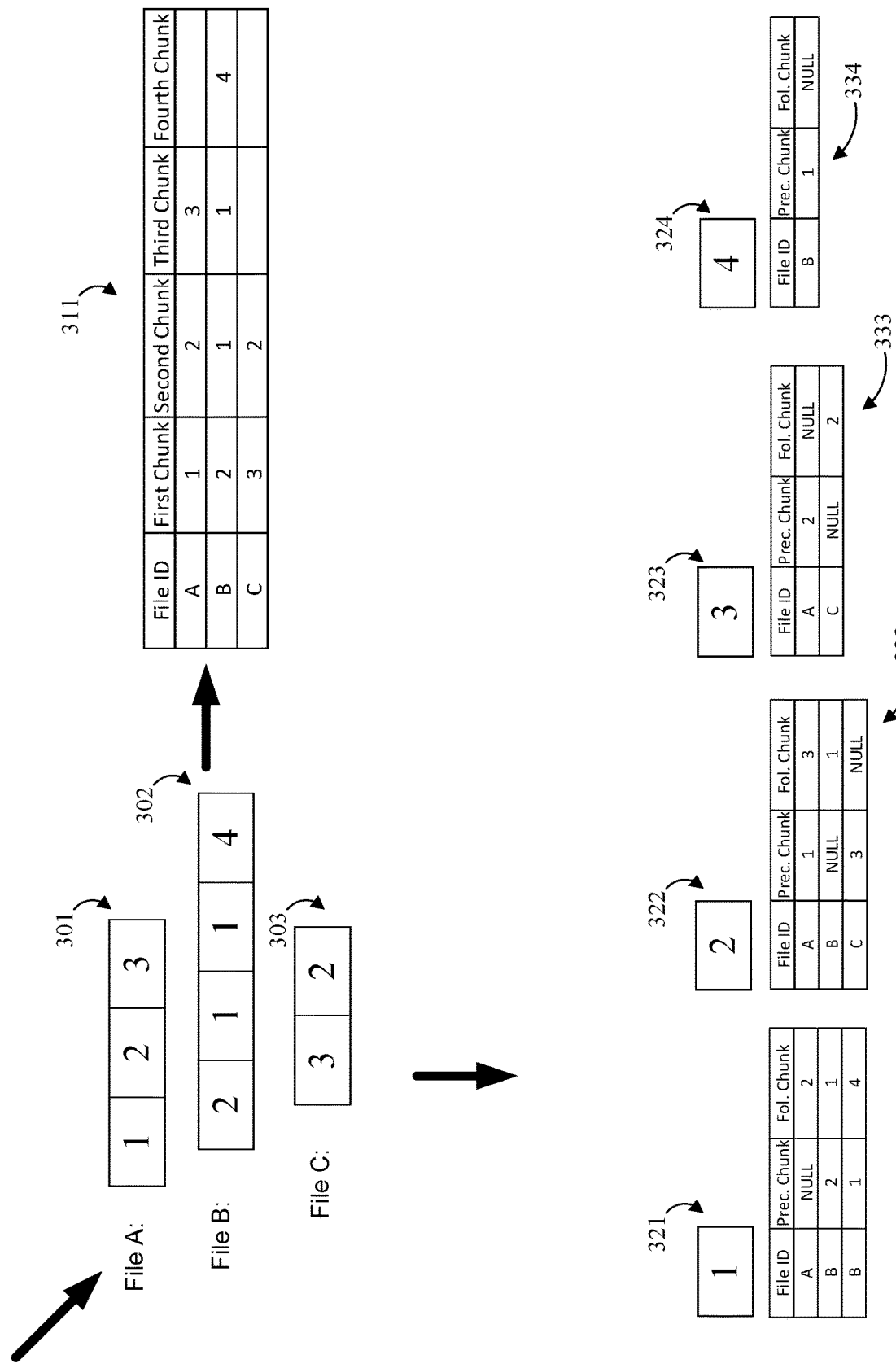
FIG. 3 illustrates a block diagram of data and metadata being stored as part of de-duplication of an example set of files, in accordance with embodiments of the present disclosure.

Referring now to FIG. 3, shown is a block diagram of data and metadata being stored as part of de-duplication of an example set of files 301-303, in accordance with embodiments of the present disclosure. As shown, the data and metadata of example files A, B, and C (301-303) are separated for storage of the files. In some embodiments, file data and file metadata are stored in separate storage entities. As used herein, a storage entity may refer to a logically and/or physically distinct storage area. A storage entity may include, for example, a disk, a partition within a disk, or a logical unit number (LUN).

As shown, the combined file metadata 311 includes the file identifier (file ID), and a sequence of pointers to the ordered chunks for each of the files 301-303. For example, the file metadata for File A includes its file ID and a pointer to a stored chunk matching its first chunk followed by a pointer to a stored chunk matching its second chunk followed by a pointer to a stored chunk matching its third chunk. This file metadata 311 is to be stored in a specific metadata structure within a storage entity.

The data of each file is divided into chunks 321-324 which are to be stored, in a non-duplicated manner, in a specific data storage structure within a storage entity. Embedded with each chunk 321-324 is corresponding chunk metadata 331-334. In the depicted example, each chunk metadata 331-334 includes a metadata field, with each row of the field representing a separate record. These records may be stored in chronological order within each chunk metadata field (e.g., with the oldest (e.g., first processed) record being listed first and the newest record being listed last).

In the depicted example, each record includes metadata about a separate instance of the corresponding chunk (or, more precisely, a chunk matching the corresponding chunk) being included in a file to be stored. Specifically, each record includes the file ID of the file that included the relevant chunk, a pointer to a stored chunk matching the preceding chunk in that file, and a pointer to a stored chunk matching the following chunk in that file. If a chunk is the first (e.g., initial) chunk in a file, then the record corresponding to that chunk includes an indicator of this primacy. For example, as depicted, the indicator can include a null value in the portion of the metadata field used for listing a preceding chunk. Likewise, if a chunk is the last chunk in a file, then a corresponding indicator can include a null value in the portion of the metadata field used for listing a following chunk.

In an example relevant to FIG. 3, a file 302 (File B) is received as part of a data stream. The file 302 includes a sequence of user data of chunk 2, chunk 1, chunk 1, and chunk 4. Upon storage of file 302 in storage media, the file metadata 311 for the file 302 includes a file ID, a pointer to stored chunk 322, followed by a pointer to stored chunk 321, followed by a second pointer to stored chunk 321, followed by a pointer to stored chunk 324. The storage of file 302 in the storage media also results in the chunk metadata 332, 331, and 334 being updated. Specifically, a record is created in chunk metadata 332 that includes a File ID of B, a null preceding chunk value, and a pointer to stored chunk 321 for the following chunk value. Furthermore, two records are created in chunk metadata 331 that include a File ID of B, pointers to stored chunks 322 and 321 for preceding chunk values, and pointers to stored chunks 321 and 324 for following chunk values. Finally, an additional record is created in chunk metadata 334 that includes a File ID of B, a pointer to stored chunk 321 for the preceding chunk value, and a null following chunk value.

Figure 4:
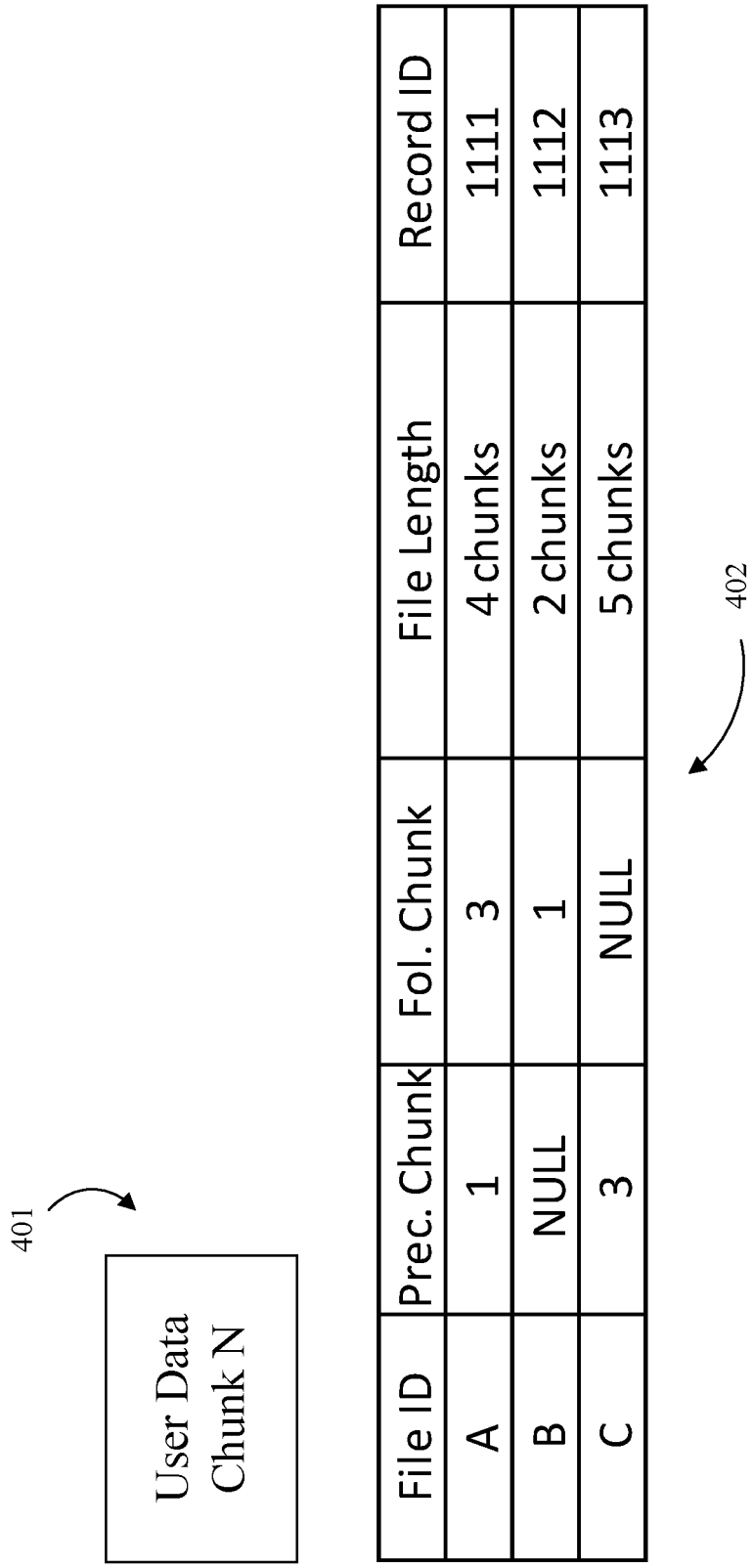
FIG. 4 illustrates a block diagram of an example data chunk with embedded metadata, in accordance with embodiments of the present disclosure.

Referring now to FIG. 4, shown is a block diagram of an example data chunk 401 with embedded metadata 402, in accordance with embodiments of the present disclosure. As shown, chunk 401 (user data chunk N) has embedded metadata 402 that includes two additional categories of chunk metadata that are not depicted in the embedded metadata shown in FIG. 3. Specifically, in the example of embedded metadata 402 each record includes a file length for the identified file and a unique record identifier (record ID) for that record. In some embodiments, including a record ID for each record aids in identifying (e.g., marking) records as they are recovered during an operation to recover file metadata (e.g., method 700 described in reference to FIG. 7 herein). In other embodiments, other recovery indicator, such as a recovery bit, may be included with each record to indicate whether or not it has been recovered yet as part of a file metadata recovery operation.

Likewise, including a file length identifier in records can also aid in file metadata recovery operations. For example, upon recovery of a given file, this length information may be checked to confirm that the recovered file is the correct length. If the length is incorrect, then it is known that file was not properly recovered.

Figure 5:
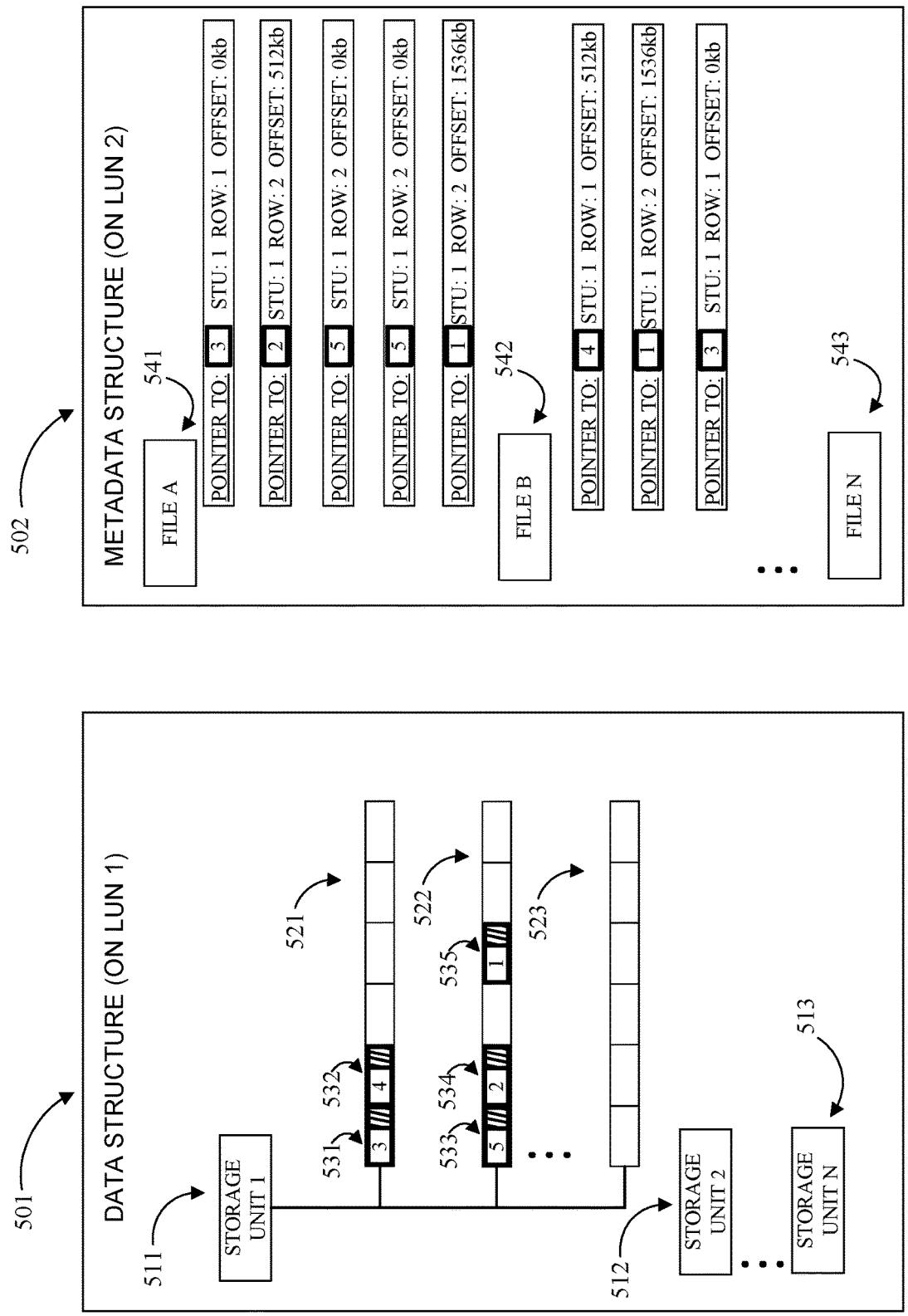
FIG. 5 illustrates a block diagram of a data structure and a separate metadata structure being used to store a set of de-duplicated files, in accordance with embodiments of the present disclosure.

Referring now to FIG. 5, shown is a block diagram of a data structure 501 and a separate metadata structure 502 being used to store a set of de-duplicated files, in accordance with embodiments of the present disclosure. As shown, data structure 501 is located on a first LUN (LUN 1). The LUN 1 is organized as group of several storage units 511-513. Each storage unit 511-513 includes a plurality of rows of data storage blocks. For example, storage unit 511 includes a first row 521, a second row 522, and an nth row 523. The blocks in the rows may all be the same size or may have variable sizes. The data structure 501 is used to store file data. The chunks of the stored file data may be stored sequentially or randomly within LUN 1. Each chunk is stored with embedded metadata (represented in the figure by the lines the chunks) that includes pointers to preceding and following chunks within individual files.

The metadata structure 502 is located on a second LUN (LUN 2). The metadata structure 502 is used to store file metadata that corresponds to file data stored on the data structure 501. In the depicted example, the file metadata is arranged by file IDs 541-543 for all of then files stored on data structure 501. Each file ID 541-543 in the metadata structure 502 is linked with a set of pointers to the chunks of the identified file in the data structure 501. These pointers are sequentially ordered for each File ID 541-543.

As shown, two files (File A and File B) are stored in this storage media. File A includes a data sequence of chunk 3, chunk 2, chunk 5, chunk 5, and chunk 1. File B includes a sequence of chunk 4, chunk 1, and chunk 3. These chunks are stored on the data structure 501 (with embedded metadata) as stored chunks 531-535. The file metadata for both files is stored on the metadata structure 502. For example, the file metadata for File A includes the file ID 541 for that file which is stored with sequential pointers to the stored chunks of that file, namely, a first pointer to stored chunk 531 followed by a second pointer to stored chunk 534 followed by a third pointer to stored chunk 533 followed by a fourth pointer to stored chunk 533 followed by a fifth pointer to stored chunk 535. In this example, each storage block in the data structure is 512 kb, and each pointer includes a storage unit number, row number, and offset value to identify the location of the corresponding stored block. For example, the pointer to stored chunk 535 indicates that the storage unit number is 1, that the row number is 2, and that the offset is 1536 kb. From this information, the location of stored chunk 535 is easily determined.

Figure 6:
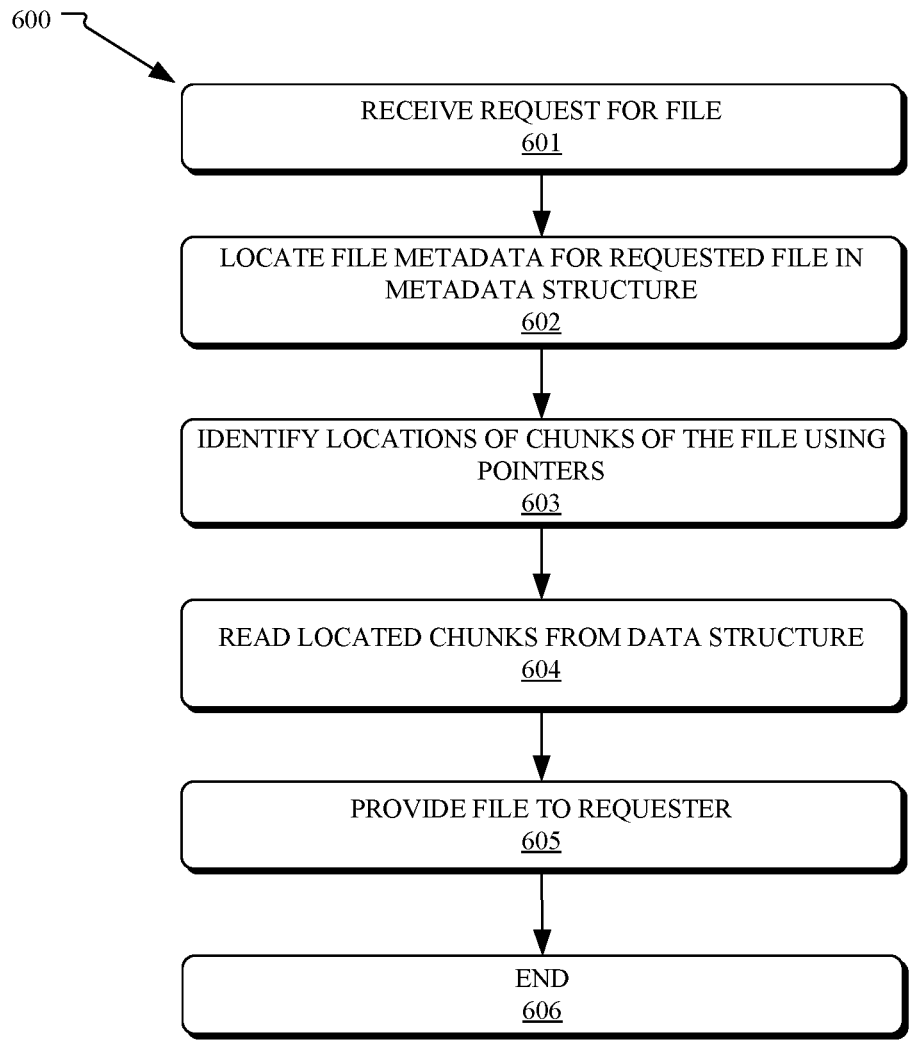
FIG. 6 illustrates a flow diagram of a method for obtaining files from a de-duplicated data storage environment, in accordance with embodiments of the present disclosure.

Referring now to FIG. 6, shown is a flow diagram of a method 600 for obtaining files from a de-duplicated data storage environment, in accordance with embodiments of the present disclosure. In some embodiments, operations of the method 600 may be performed by a processor of a computer storage system. The method 600 may begin at operation 601, wherein the system receives a request for a file stored in storage media. The request may be received from, for example, a remote computer that needs to view the file. Per operation 602, the file metadata for the requested file is located in a metadata structure within the storage media. Per operation 603, sequential pointers within the file metadata are used to identify the locations of the chunks of data that make up the file. Per operation 604, the contents of the data chunks, which are located in a data structure within the storage media, are read to put together the file. Per operation 605, the file is provided to the requester (e.g., the remote computer). Per operation 606, the method ends. It should be noted that, in some embodiments of the method 600, the embedded metadata stored with each chunk are not used (e.g., are ignored) for the purposes providing requested files during the course of normal operations of the system. Instead, the pointers stored in the metadata structure are used to gather the fragments of the requested file. This may have significant operational benefits (in terms of time and computing resources) as compared to using the chunk metadata when obtaining files.

An example use of operations of the method 600 is now described with reference to the structures of FIG. 5. In this example, a user on a remote computer requests to access a copy of File A. The request is sent to a storage system that manages storage media upon which File A is stored. The system locates the file ID 541 for File A in the metadata structure 502. Using the pointers located with File ID 541, the system reads out stored chunk 531, stored chunk 534, stored chunk 533, stored chunk 533, and stored chunk 535 from the data structure 501. The system then combines the chunks to reconstitute File A. The embedded metadata in each of the chunks may or may not be included in the reconstituted File A. The system then provides File A to the remote computer.

Figure 7:
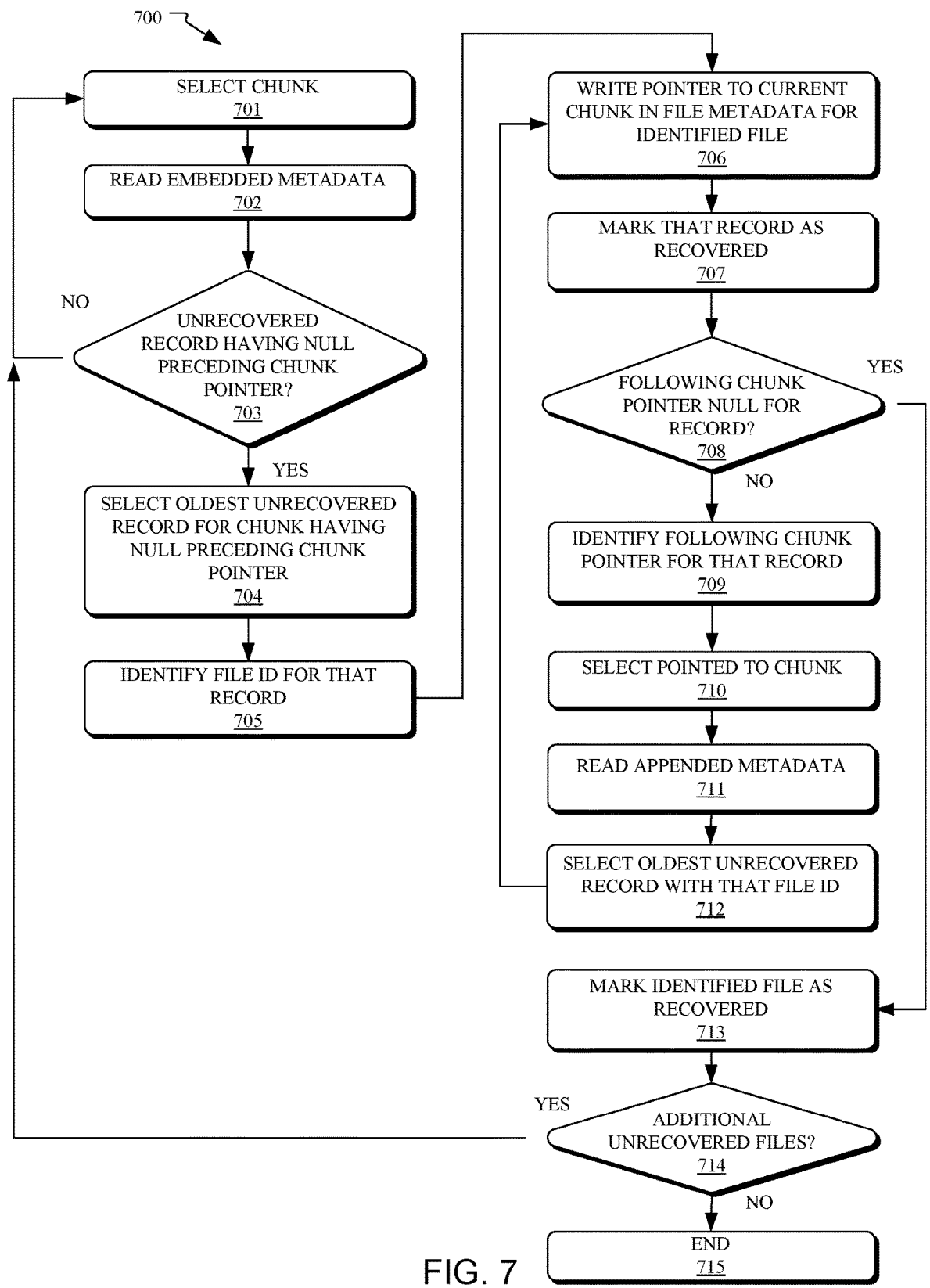
FIG. 7 illustrates a flow diagram of a method of recovering file metadata within a de-duplicated data storage environment, in accordance with embodiments of the present disclosure.

Referring now to FIG. 7, shown is a flow diagram of a method 700 of recovering file metadata within a de-duplicated data storage environment, in accordance with embodiments of the present disclosure. In some embodiments, operations of the method 700 may be performed by a processor of a computer storage system. Specifically, the system may perform the method 700 in response to detecting that file metadata for one, some, or all of the files stored on storage media has been lost or corrupted. For example, method 700 in may be performed in response to determining that the metadata structure 502 of FIG. 5 has been corrupted.

The method may begin at operation 701, wherein a chunk stored in a data storage structure (e.g., chunk 531 of data structure 501 of FIG. 5) is selected. Per operation 702, metadata embedded with the stored chunk is read. Per operation 703, a determination is made as to whether there is any unrecovered record in the chunk metadata that has a null value for its preceding chunk pointer. If not, then the method loops back to operation 701 and new chunk (e.g., the next chunk in data structure) is selected. If there are unrecovered records with null preceding chunk pointer values, then, per operation 704, the oldest unrecovered record in that chunk metadata that has a null preceding chunk pointer value is selected. Per operation 705, the File ID corresponding with (e.g., included in) that record is identified.

Per operation 706, a pointer to the current stored chunk (e.g., the chunk wherein the null value was found) is written into the file metadata for the identified file. This serves to represent that this current stored chunk is the first (e.g., initial) chunk in the identified file. Per operation 707, the record containing that null value is marked as recovered. This may be done, for example, by indicating that the record is recovered in a recovery history table (e.g., recovery history table 801 of FIG. 8). Another method of marking a record as recovered includes, in some embodiments, moving a recovery pointer (or other marker) down to the most recently recovered record for each File ID in each chunk metadata (or a copy of each chunk metadata loaded into memory during a recovery operation). During further reads of the chunk metadata, this recovery pointer then serves to indicate which records are recovered for a particular File ID (e.g., the records at or above (older than) the currently marked record) and which records are not recovered for the particular File ID (e.g., the records below the currently marked record).

Next, per operation 708, a determination is made as to whether the following chunk pointer for this (now recovered) record is null. If not, then, per operation 709, the following chunk pointer for the record is identified. Per operation 710, the chunk pointed to by that pointer is selected. Per operation 711, the chunk metadata embedded with that pointed to chunk is read. Per operation 712, the oldest unrecovered record with the identified File ID (e.g., the File ID identified in operation 705) in this chunk metadata is selected. It should be noted that this record may, in many instances, be different from the oldest unrecovered record per se in the chunk metadata (e.g., when the oldest record per se is for a different file). Next, per operation 706, a pointer to the current stored chunk (e.g., the chunk selected in operation 712) is written to the file metadata for the identified file. This serves to represent that this chunk is the next chunk in the identified file. In some embodiments, this new pointer is written to a location immediately following the pointer to the preceding chunk so that the chunks may be read sequentially during future accesses of the identified file, which may occur, for example, via method 600 of FIG. 6. Per operation 707, the record is marked as recovered.

The method then proceeds back to operation 708, wherein a new determination is made as to whether the following chunk pointer for the current (now recovered) record is null. The method loops through operations 706 to 712 until a record with a null pointer value for the following chunk is found. This serves to represent that this current stored chunk is the last (e.g., final) chunk in the identified file. Once this occurs, the method proceeds to operation 713, wherein the identified file is marked as recovered. This may be done, for example, by indicating that the identified file is recovered in a recovery history table (e.g., recovery history table 801 of FIG. 8). Per operation 714, a determination is made as to whether there are additional unrecovered files (e.g., files in storage media for which the file metadata has not been recovered and re-added to the metadata structure). If there are additional unrecovered files, then the method returns to operation 701 and loops through operations 701-714 as appropriate. If there are no additional unrecovered files, then, per operation 715, the method ends.

An example use of operations of the method 700 is now described with reference to the files shown in FIG. 3. In this example, the file metadata 311 for the Files A, B, and C is lost from a metadata structure of storage media in which the files are stored. This loss is detected, and a recovery operation is begun by the system. As part of the recovery operation, the embedded metadata 331 of stored chunk 321 ("Chunk 1") is read. The first record in embedded metadata 331 is selected as the oldest unrecovered record with a null value for the preceding chunk pointer. The file ID ("File A") is identified. A pointer to Chunk 1 is written to a new version of the file metadata 311 for File A. The record is then marked as recovered. Because the following chunk pointer for the record identifies stored chunk 322 ("Chunk 2"), that chunk is selected, the embedded metadata 332 is read, and the first record in embedded metadata 332 is selected as the oldest unrecovered record with the File A identifier. A pointer to Chunk 2 is written to the new version of the file metadata 311 for File A. The record is then marked as recovered.

Next, because the following chunk pointer for the record identifies stored chunk 323 ("Chunk 3"), that chunk is selected, the embedded metadata 333 is read, and the first record in embedded metadata 333 is selected as the oldest unrecovered record with the File A identifier. A pointer to the Chunk 3 is written to the new version of the file metadata 311 for File A. The record is then marked as recovered. Because the following chunk pointer for the record is null, File A is marked as recovered.

Having recovered File A, the system proceeds to select Chunk 1 again. Because there are no longer any unrecovered records with null preceding chunk pointers in the embedded metadata 331 of Chunk 1, the system proceeds to select Chunk 2. The second record in embedded metadata 332 is selected as the oldest unrecovered record with a null preceding chunk pointer. The file ID ("File B") is identified for that record. Because the preceding chunk pointer for that record is null, a pointer to Chunk 2 is written to a new version of the file metadata 311 for File B. The record is then marked as recovered. Because the following chunk pointer for the record identifies Chunk 1, that chunk is selected, the embedded metadata 331 is read, and the second record in embedded metadata 331 is selected as the oldest unrecovered record with the File B identifier. A pointer to the Chunk 1 is written to the new version of the file metadata 311 for File B. The record is then marked as recovered.

Because the following chunk pointer for the record identifies Chunk 1, that chunk is selected again. The embedded metadata 331 is read, and the third record in embedded metadata 331 is selected as the oldest unrecovered record with the File B identifier (because the second record was already recovered). A pointer to Chunk 1 is written to the new version of the file metadata 311 for File B. The record is then marked as recovered.

Next, because the following chunk pointer for the record identifies stored chunk 324 ("Chunk 4"), that chunk is selected, the embedded metadata 334 is read, and the first record in embedded metadata 334 is selected as the oldest unrecovered record with the File B identifier. A pointer to Chunk 4 is written to the new version of the file metadata 311 for File B. The record is then marked as recovered. Because the following chunk pointer for the record is null, File B is marked as recovered.

Having recovered Files A and B, the system proceeds to select Chunk 1 again. Because there are no longer any unrecovered records with null preceding chunk pointers in the embedded metadata 331 of Chunk 1, the system proceeds to select Chunk 2. Next, because there are no longer any unrecovered records with null preceding chunk pointers in the embedded metadata 332 of Chunk 2, the system proceeds to select Chunk 3. The embedded metadata 333 of Chunk 3 is read. The second record in embedded metadata 333 is selected as the oldest unrecovered record with a null preceding chunk pointer. The file ID ("File C") is identified for that record. Because the preceding chunk pointer for that record is null, a pointer to Chunk 3 is written to a new version of the file metadata 311 for File C. The record is then marked as recovered.

Because the following chunk pointer for the record identifies Chunk 2, that chunk is selected, the embedded metadata 332 is read, and the third record in embedded metadata 332 is selected as the oldest unrecovered record with the File C identifier. A pointer to Chunk 2 is written to the new version of the file metadata 311 for File C. The record is then marked as recovered. Because the following chunk pointer for the record is null, File C is marked as recovered. The file metadata 311 for all three of the Files A, B, and C having been recovered, the system ends the recovery operation.

While example embodiments of the methods have been provided herein, it is contemplated that many variations on these methods may occur. For example, in some embodiments, each record in metadata embedded with a particular chunk may include a single pointer to only one other chunk. This other chunk may be a chunk that is next to (e.g., either preceding or following) the particular chunk in the file to which that record relates. Such embodiments ("single-pointer embodiments") may allow a file to be stored with less chunk metadata than embodiments including pointers to both chunks (e.g., the one preceding and the one following) that are next to the particular chunk in the relevant file. Such embodiments may include a first (e.g., initial) chunk indicator and a last chunk indicator for each stored file. These indicators may take the form of indicator bits, null values, or other information within the chunk metadata.

There are at least two examples of these single-pointer embodiments. In a first example, each record includes a pointer to a preceding chunk and does not include a pointer to a following chunk. In this example, a record associated with an initial chunk in a file may include a null value for the preceding chunk pointer portion of the embedded metadata. Correspondingly, a record associated with a last chunk in that file may include some other indicator (e.g., a known, last chunk identifier value) that serves to indicate the last chunk.

To recover file metadata using this first example single-pointer embodiment, the records having a particular file ID may be checked until a record with the last chunk indicator is identified. A pointer to the chunk associated with this record is included in the file metadata for this file ID as the last pointer in a (to be created) sequence of pointers. The file ID may then be traced backwards through the records (e.g., via the preceding chunk pointers) until the record with the null value is found. Traced through records are marked as recovered and pointers to the chunks associated with these records are added to the front of the sequence of pointers. Because the file metadata is being recovered backwards, the newest record with the selected file ID (rather than the oldest) is selected when tracing through embedded metadata for a given chunk. Once the record with the null value is found, the recovery of the file metadata for that file ID is complete, and a new file ID is selected. This repeats until the file metadata for all of the relevant files are recovered.

In a second example of these single pointer embodiments, each record includes a pointer to a following chunk and does not include a pointer to a preceding chunk. In this example, a record associated with a last chunk in a file may include a null value for the following chunk pointer portion of the embedded metadata. Correspondingly, a record associated with an initial chunk in that file may include some other indicator (e.g., a known, first chunk identifier value) that serves to indicate the initial chunk.

To recover file metadata using this second example single-pointer embodiment, the records having a particular file ID may be checked until a record with the initial chunk indicator is identified. A pointer to the chunk associated with this record is included in the file metadata for this file ID as the first pointer in a (to be created) sequence of pointers. The file ID may then be traced forwards through the records (e.g., via the following chunk pointers) until the record with the null value is found. Traced through records are marked as recovered (with the oldest unrecovered records with the file ID being selected for use) and pointers to the chunks associated with these records are added to the end of the sequence of pointers. Once the record with the null value is found, the recovery of the file metadata for that file ID is complete, and a new file ID is selected. This repeats until the file metadata for all of the relevant files are recovered.

Figure 8:
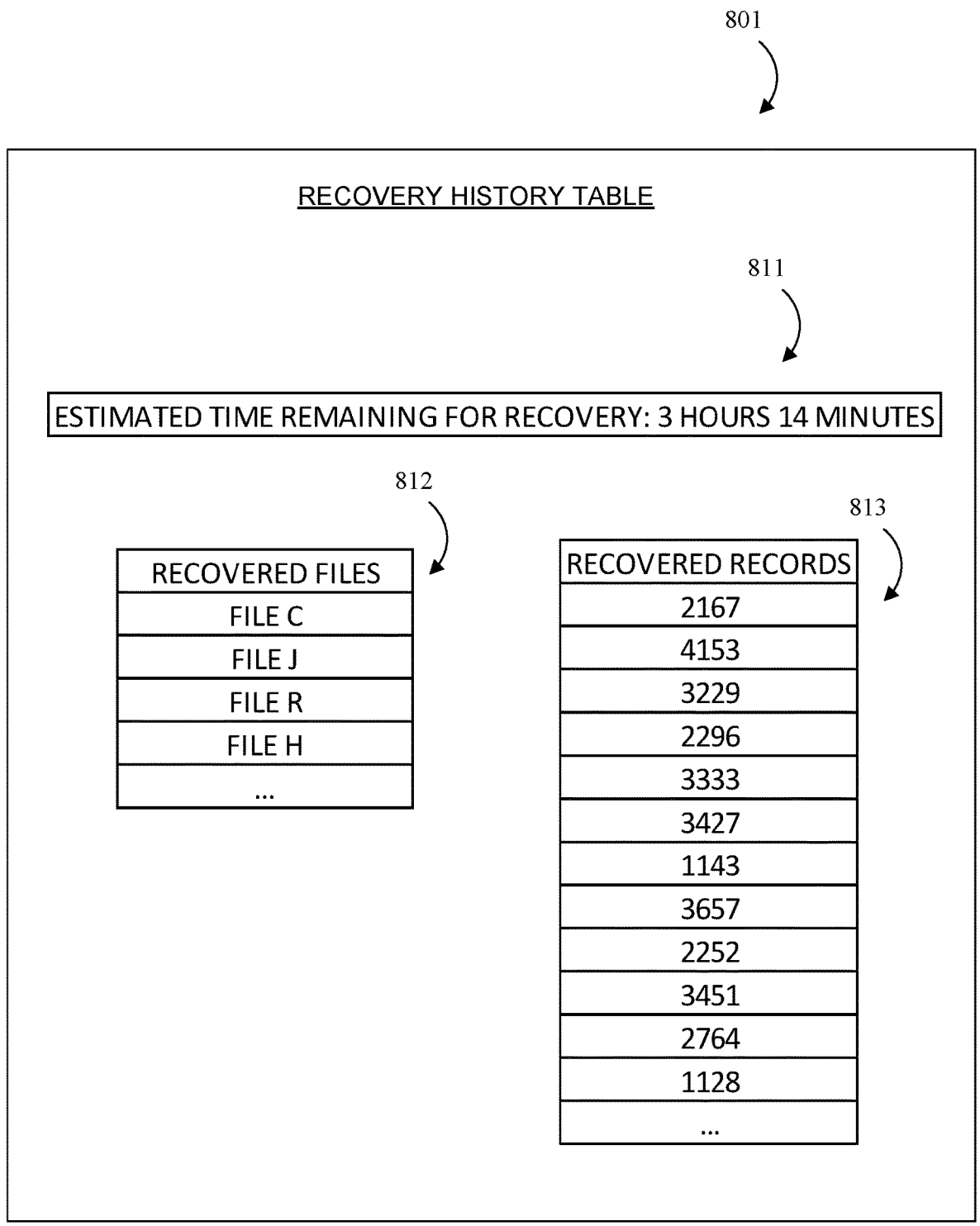
FIG. 8 illustrates a block diagram of an example recovery history table, in accordance with embodiments of the present disclosure.

Referring now to FIG. 8, shown is a block diagram of an example recovery history table 801, in accordance with embodiments of the present disclosure. In some embodiments, recovery history table 801 is used to track the progress of a file metadata recovery operation. In doing so, the table 801 may serve at least two purposes. First, the table 801 allows a recovery operation to be stopped (either intentionally or unintentionally) and restarted at a later time without having to start the entire operation over again from the beginning. Second, the table may also include a listing of recovered records 813 and recovered files 812.

In some embodiments, table 801 can serve as the location as the place where records and files are marked as recovered. For example, the record identifier (record ID) for a newly recovered record may be added to the recovered records listing 813. Then during the course of the recovery operation, the record ID of selected record may be checked against the list in order to determine whether it has been recovered or not. Likewise, using the recovered files listing 812, the identity of the files that have been recovered can be determined. In addition, the table 801 may include a progress bar 811 that indicates to a user how much longer the recovery operation will take to complete.

Figure 9:
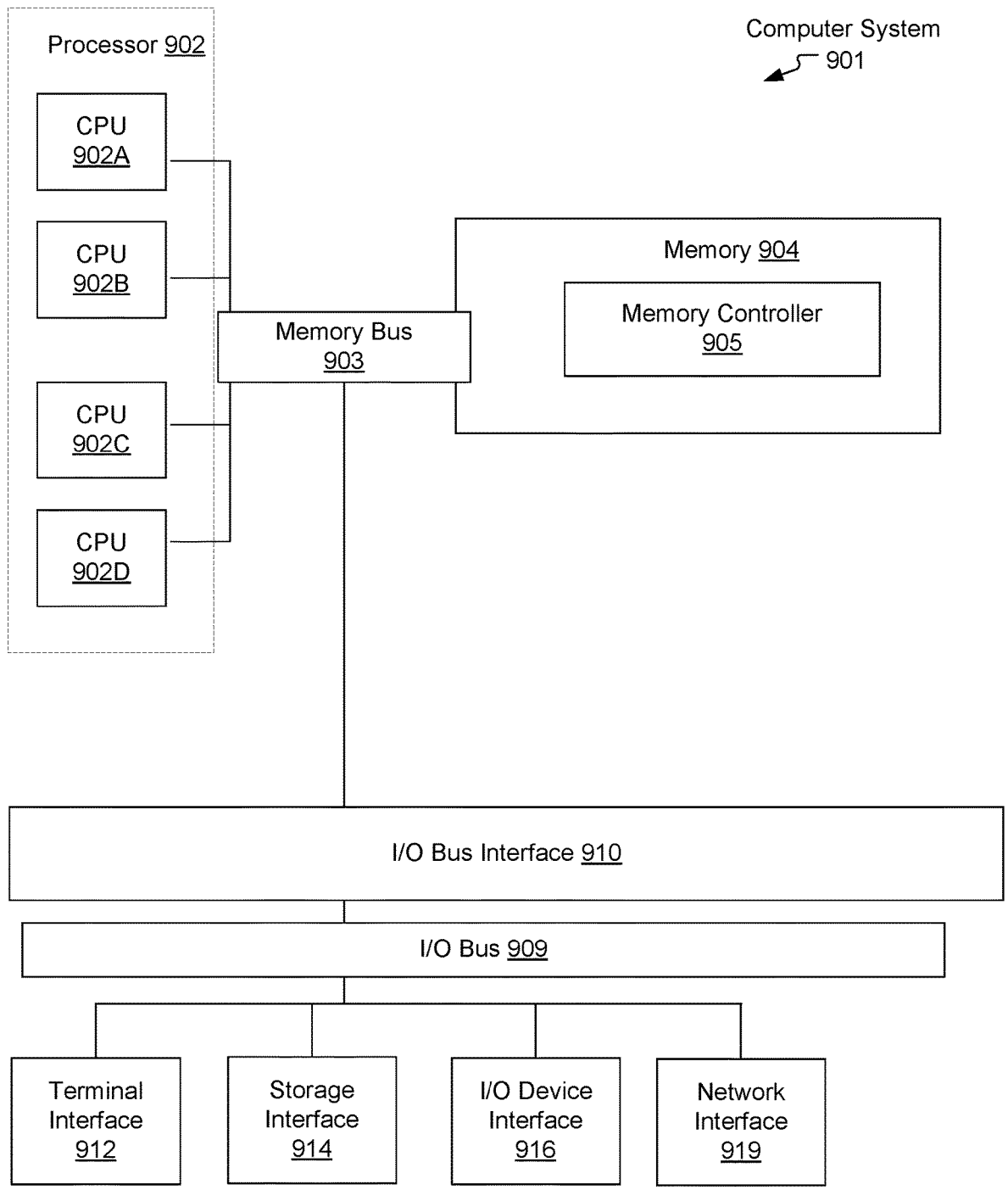
FIG. 9 illustrates a high-level block diagram of an example computer system that may be used in implementing embodiments of the present disclosure.

Some embodiments of the present disclosure may offer various technical computing advantages over the prior art. These computing advantages address problems arising in the realm of computer storage systems and the associated problems of computer performance and reliability that occur when metadata is lost or corrupted. Implementation of embodiments of the method 700, for example, can result in improved system performance and technical computing advantages. Embodiments herein recognize that using pointers in metadata embedded with data chunks can have significant advantages (e.g., in terms of computing resources) in file metadata recovery Referring now to FIG. 9, shown is a high-level block diagram of an example computer system (i.e., computer) 901 that may be used in implementing one or more of the methods or modules, and any related functions or operations, described herein (e.g., using one or more processor circuits or computer processors of the computer), in accordance with embodiments of the present disclosure. In some embodiments, the major components of the computer system 901 may comprise one or more CPUs 902, a memory subsystem 904, a terminal interface 912, a storage interface 914, an I/O (Input/Output) device interface 916, and a network interface 919, all of which may be communicatively coupled, directly or indirectly, for inter-component communication via a memory bus 903, an I/O bus 909, and an I/O bus interface unit 910.

The computer system 901 may contain one or more general-purpose programmable central processing units (CPUs) 902A, 902B, 902C, and 902D, herein generically referred to as the processer 902. In some embodiments, the computer system 901 may contain multiple processors typical of a relatively large system; however, in other embodiments the computer system 901 may alternatively be a single CPU system. Each CPU 902 may execute instructions stored in the memory subsystem 904 and may comprise one or more levels of on-board cache.

In some embodiments, the memory subsystem 904 may comprise a random-access semiconductor memory, storage device, or storage medium (either volatile or non-volatile) for storing data and programs. In some embodiments, the memory subsystem 904 may represent the entire virtual memory of the computer system 901, and may also include the virtual memory of other computer systems coupled to the computer system 901 or connected via a network. The memory subsystem 904 may be conceptually a single monolithic entity, but, in some embodiments, the memory subsystem 904 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 904 may contain elements for control and flow of memory used by the Processor 902. This may include a memory controller 905.

Although the memory bus 903 is shown in FIG. 9 as a single bus structure providing a direct communication path among the CPUs 902, the memory subsystem 904, and the I/O bus interface 910, the memory bus 903 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 910 and the I/O bus 909 are shown as single respective units, the computer system 901 may, in some embodiments, contain multiple I/O bus interface units 910, multiple I/O buses 909, or both. Further, while multiple I/O interface units are shown, which separate the I/O bus 909 from various communications paths running to the various I/O devices, in other embodiments some or all of the I/O devices may be connected directly to one or more system I/O buses.

In some embodiments, the computer system 901 may be a multi-user mainframe computer system, a single-user system, or a server computer or similar device that has little or no direct user interface, but receives requests from other computer systems (clients). Further, in some embodiments, the computer system 901 may be implemented as a desktop computer, portable computer, laptop or notebook computer, tablet computer, pocket computer, telephone, smart phone, mobile device, or any other appropriate type of electronic device.

It is noted that FIG. 9 is intended to depict the representative major components of an exemplary computer system 901. In some embodiments, however, individual components may have greater or lesser complexity than as represented in FIG. 9, components other than or in addition to those shown in FIG. 9 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term "each" does not necessarily equate to the term "all" as the term "all" is used colloquially. For example, the following two phrases have different meanings: "a car having a plurality of tires, each tire of the plurality of tires being fully inflated" and "a car that has all of its tires fully inflated". The former phrase would encompass a car with three fully-inflated tires (the plurality of tires) and one flat tire (not included in the plurality of tires). The latter phrase would not encompass such a car (because not all of the car's tires are fully inflated). Likewise, the phrase "a computer having a set of files, each file of the set of files being read-only" would encompass a computer having two files, one of which is read-only (and belongs to the set of files) and one of which is not read-only (and does not belong to the set of files).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method for storing a data stream in storage media, the method comprising:
dividing the data stream into a plurality of chunks, the plurality of chunks including a target chunk that is next to a first chunk in a file within the data stream;
determining that the target chunk matches an existing chunk stored in the storage media;
creating, in response to the determining, a first pointer to the existing stored chunk in file metadata for the file, wherein the first pointer indicates a location of the existing stored chunk in the storage media;
creating, in response to the determining, a second pointer to a first stored chunk that matches the first chunk in chunk metadata embedded with the existing stored chunk, wherein the second pointer serves to indicate that the target chunk is next to the first chunk in the file;
detecting that the file metadata is lost or corrupted; and
performing, in response to the detecting, a recovery operation, wherein the recovery operation comprises:
reading the chunk metadata embedded with the existing stored chunk;
determining, based on the reading the chunk metadata embedded with the existing stored chunk, that the target chunk is next to the first chunk in the file; and
creating a recovered version of the file metadata, wherein based on the determining that the target chunk is next to the first chunk in the file, the recovered version of the file metadata indicates that the target chunk is next to the first chunk in the file.

2. The method of claim 1, wherein the target chunk is preceded by the first chunk in the file and followed by a third chunk in the file, the method further comprising:
creating, in response to the determining, a third pointer to a third stored chunk that matches the third chunk in chunk metadata embedded with the existing stored chunk.

3. The method of claim 2, wherein the third chunk is followed, in the file, by a fourth chunk of the plurality of chunks, the method further comprising:
determining that the third chunk does not match any existing chunks stored in the storage media;
storing, in response to the determining that the third chunk does not match any existing stored chunks, the third chunk in the storage media as the third stored chunk;
creating a fourth pointer to the third stored chunk in the file metadata for the file; and
creating a fifth pointer to the existing stored chunk and a sixth pointer to a fourth stored chunk that matches the fourth chunk in chunk metadata embedded with the third stored chunk.

4. The method of claim 1, wherein the file metadata is stored in a separate storage entity from a storage entity in which the existing stored chunk is stored with the embedded chunk metadata.

5. The method of claim 1, wherein the file metadata for the file includes a sequence of pointers to chunks stored in the storage media, wherein the ordering of the pointers in the sequence indicates the ordering of the chunks in the file.

6. The method of claim 5, wherein the sequence of pointers indicates that the target chunk is an initial chunk in the file by including the first pointer as an initial pointer in the sequence of pointers.

7. The method of claim 5, wherein the sequence of pointers indicates that the first chunk immediately follows the target chunk in the file by including a pointer to the first stored chunk immediately following the first pointer in the sequence of pointers.

8. The method of claim 1, further comprising:
receiving a request to access the file;

using the file metadata to reconstitute the file; and
providing the file.

9. The method of claim 8, wherein the chunk metadata is not used in the reconstituting the file.

10. A computer program product for storing a data stream in storage media, the computer program product comprising a computer readable storage medium, wherein the computer readable storage medium is not a transitory signal per se, the computer readable storage medium having program instructions embodied therewith, the programs instructions configured, when executed by at least one computer, to cause the at least one computer to perform a method comprising:
dividing the data stream into a plurality of chunks, the plurality of chunks including a target chunk that is next to a first chunk in a file within the data stream;
determining that the target chunk matches an existing chunk stored in the storage media;
creating, in response to the determining, a first pointer to the existing stored chunk in file metadata for the file, wherein the first pointer indicates a location of the existing stored chunk in the storage media;
creating, in response to the determining, a second pointer to a first stored chunk that matches the first chunk in chunk metadata embedded with the existing stored chunk, wherein the second pointer serves to indicate that the target chunk is next to the first chunk in the file;
detecting that the file metadata is lost or corrupted; and
performing, in response to the detecting, a recovery operation, wherein the recovery operation comprises:
reading the chunk metadata embedded with the existing stored chunk;
determining, based on the reading the chunk metadata embedded with the existing stored chunk, that the target chunk is next to the first chunk in the file; and
creating a recovered version of the file metadata, wherein based on the determining that the target chunk is next to the first chunk in the file, the recovered version of the file metadata indicates that the target chunk is next to the first chunk in the file.

11. The computer program product of claim 10, wherein the target chunk is preceded by the first chunk in the file and followed by a third chunk in the file, and wherein the method further comprises:
creating, in response to the determining, a third pointer to a third stored chunk that matches the third chunk in chunk metadata embedded with the existing stored chunk.

12. The computer program product of claim 11, wherein the third chunk is followed, in the file, by a fourth chunk of the plurality of chunks, and wherein the method further comprises:
determining that the third chunk does not match any existing chunks stored in the storage media;
storing, in response to the determining that the third chunk does not match any existing stored chunks, the third chunk in the storage media as the third stored chunk;
creating a fourth pointer to the third stored chunk in the file metadata for the file; and
creating a fifth pointer to the existing stored chunk and a sixth pointer to a fourth stored chunk that matches the fourth chunk in chunk metadata embedded with the third stored chunk.

13. The computer program product of claim 10, wherein the file metadata is stored in a separate storage entity from a storage entity in which the existing stored chunk is stored with the embedded chunk metadata.

14. The computer program product of claim 10, wherein the file metadata for the file includes a sequence of pointers to chunks stored in the storage media, wherein the ordering of the pointers in the sequence indicates the ordering of the chunks in the file.

15. The computer program product of claim 14, wherein the sequence of pointers indicates that the target chunk is an initial chunk in the file by including the first pointer as an initial pointer in the sequence of pointers.

16. The computer program product of claim 14, wherein the sequence of pointers indicates that the first chunk immediately follows the target chunk in the file by including a pointer to the first stored chunk immediately following the first pointer in the sequence of pointers.

17. The computer program product of claim 10, wherein the method further comprises:
receiving a request to access the file;
using the file metadata to reconstitute the file; and
providing the file.

18. The computer program product of claim 17, wherein the chunk metadata is not used in the reconstituting the file.

19. A system for storing a data stream in storage media, the system comprising:
a memory; and
a processor in communication with the memory, the processor configured to obtain instructions from the memory that cause the processor to perform a method comprising:
dividing the data stream into a plurality of chunks, the plurality of chunks including a target chunk that is next to a first chunk in a file within the data stream;
determining that the target chunk matches an existing chunk stored in the storage media;
creating, in response to the determining, a first pointer to the existing stored chunk in file metadata for the file, wherein the first pointer indicates a location of the existing stored chunk in the storage media;
creating, in response to the determining, a second pointer to a first stored chunk that matches the first chunk in chunk metadata embedded with the existing stored chunk, wherein the second pointer serves to indicate that the target chunk is next to the first chunk in the file;
detecting that the file metadata is lost or corrupted; and
performing, in response to the detecting, a recovery operation, wherein the recovery operation comprises:
reading the chunk metadata embedded with the existing stored chunk;
determining, based on the reading the chunk metadata embedded with the existing stored chunk, that the target chunk is next to the first chunk in the file; and
creating a recovered version of the file metadata, wherein based on the determining that the target chunk is next to the first chunk in the file, the recovered version of the file metadata indicates that the target chunk is next to the first chunk in the file.

* * * * *